United States Patent
Ohtake (10) Patent No.: US 7,605,878 B2
(45) Date of Patent: Oct. 20, 2009

(54) PANEL UNIT CAPABLE OF AVOIDING CONTACT BETWEEN ELECTRICALLY CONDUCTIVE BODIES THEREON

(75) Inventor: Seiji Ohtake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 776 days.

(21) Appl. No.: 10/983,054

(22) Filed: Nov. 8, 2004

(65) Prior Publication Data

US 2006/0032664 A1 Feb. 16, 2006

(30) Foreign Application Priority Data

Aug. 12, 2004 (JP) ............................. 2004-235561

(51) Int. Cl.
*G02F 1/1333* (2006.01)
*G02F 1/1339* (2006.01)

(52) U.S. Cl. .................... 349/58; 349/155; 349/156; 349/153

(58) Field of Classification Search ................ 349/153, 349/155, 156, 12, 58
See application file for complete search history.

(56) References Cited

U.S. PATENT DOCUMENTS

| | | | | |
|---|---|---|---|---|
| 6,061,117 | A * | 5/2000 | Horie et al. ................. | 349/156 |
| 6,433,852 | B1 * | 8/2002 | Sonoda et al. .............. | 349/156 |
| 6,555,235 | B1 | 4/2003 | Aufderheide et al. | |
| 6,721,019 | B2 | 4/2004 | Kono et al. | |
| 2002/0130849 | A1 | 9/2002 | Ahn et al. | |
| 2003/0122801 | A1 | 7/2003 | Yu | |
| 2003/0141118 | A1 | 7/2003 | Kakuno | |
| 2004/0027761 | A1 | 2/2004 | Fukui et al. | |
| 2005/0030294 | A1 | 2/2005 | Ahn et al. | |

FOREIGN PATENT DOCUMENTS

| | | |
|---|---|---|
| JP | 8-241646 | 9/1996 |
| JP | 2001-249766 | 9/2001 |
| JP | 2001-296971 | 10/2001 |
| JP | 2002-041231 A | 2/2002 |
| JP | 2002-157089 A | 5/2002 |
| JP | 2003-223281 A | 8/2003 |
| JP | 2004-503028 A | 1/2004 |

OTHER PUBLICATIONS

European Search Report, mailed Mar. 27, 2007, and issued in corresponding European Patent Application No. 04257220.6-2224.
"Japanese Office Action", Partial English-language translation, mailed by the Japanese Patent Office Jun. 16, 2009 in reference to corresponding JP App. No. 2004235561.

* cited by examiner

*Primary Examiner*—David Nelms
*Assistant Examiner*—David Y Chung
(74) *Attorney, Agent, or Firm*—Fujitsu Patent Center (57) ABSTRACT

A first electrically conductive body and a first solid body are located on the same side of a first base member. A second electrically conductive body is located on a second base member at a position opposed to the first electrically conductive body. A second solid body is located on the second base member at a position opposed to the first solid body. Even when a larger urging force is applied on the second base member, the panel unit allows the first and second solid bodies to receive the urging force. The first and second solid bodies serve to hold the urging force. A predetermined space can thus reliably be kept between the first and second electrically conductive bodies. Establishment of electric connection can be prevented between the first and second electrically conductive bodies. The panel unit keeps normally operating.

18 Claims, 6 Drawing Sheets

PANEL UNIT CAPABLE OF AVOIDING CONTACT BETWEEN ELECTRICALLY CONDUCTIVE BODIES THEREON

BACKGROUND OF THE INVENTION

1. Field of the Invention

The present invention relates to a panel unit such as a touch screen panel unit, for example.

2. Description of the Prior Art

A so-called analog resistive touch screen panel unit includes a glass substrate and a resin film opposing the back surface to the front surface of the glass substrate. Indium-tin oxide (ITO) films are formed to spread over the front surface of the glass substrate and the back surface of the resin film, respectively. A double-sided adhesive tape is located along the peripheries of the glass substrate and the resin film so as to adhere the glass substrate and the resin film to each other.

Figure 6:
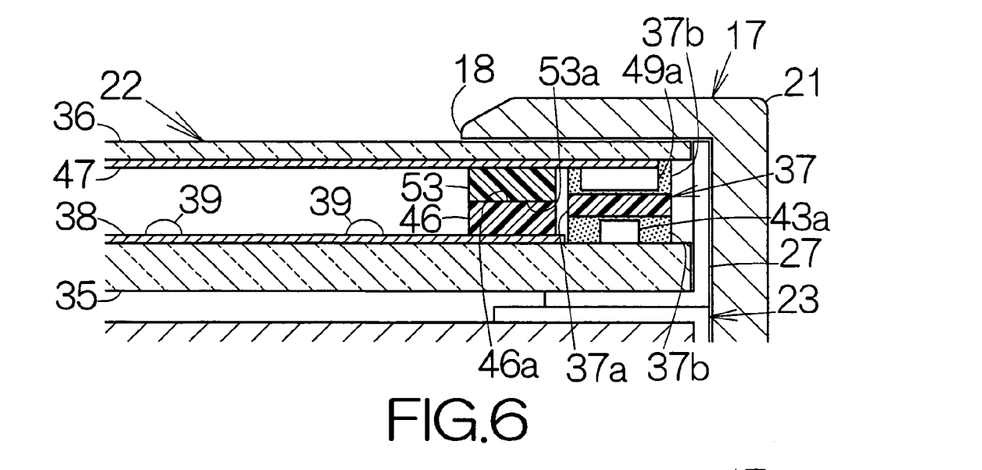
FIG. 6 is an enlarged partial sectional view schematically illustrating the structure of the touch screen panel unit according to a specific example.

For example, Japanese Patent Application Publication No. 8-241646 discloses an insulator layer located inside the double-sided adhesive tape between the glass substrate and the resin film as shown in FIG. 6. The insulator layer serves to avoid erroneous contacts between the ITO films. Erroneous input can thus be prevented. A conventional printing process is effected to form the insulator layer. An insulator ink is applied on the surface of the glass substrate, for example. The printed insulator ink gets cured based on exposure to heat or ultraviolet. The printed ink of a larger thickness leads to a longer working time for forming the insulator layer. The productivity of the touch screen panel unit gets deteriorated.

SUMMARY OF THE INVENTION

It is accordingly an object of the present invention to provide a panel unit and a display apparatus contributing to an improved productivity in a facilitated manner.

According to a first aspect of the present invention, there is provided a panel unit comprising: a first base member; a first electrically conductive body located on a side of the first base member; a first solid body located on the side of the first base member; a second base member opposed to the first base member, said first electrically conductive body located between the first and second base members; a second electrically conductive body located on the second base member at a position opposed to the first electrically conductive body; and a second solid body located on the second base member at a position opposed to the first solid body.

Even when a larger urging force is applied on the second base member, the panel unit allows the first and second solid bodies to receive the urging force. The first and second solid bodies serve to hold the urging force. A predetermined space can thus reliably be kept between the first and second electrically conductive bodies. Accordingly, establishment of electric connection can be prevented between the first and second electrically conductive bodies. The panel unit keeps normally operating.

In addition, the separate first and second solid bodies are interposed between the first and second base members in the panel unit. As compared with the case where a single insulating film is employed between the first and second base members, the thickness of the individual first and second solid bodies can be reduced. It is possible to reduce the working time for forming the first and second solid bodies. The productivity of the panel unit can thus be improved in a facilitated manner.

The second solid body may be superposed on the first solid body in the panel unit. The first and second bodies reliably cooperate to receive the urging force between the first and second base members. In this case, the second solid body may define a flat surface thereon for receiving a flat surface of the first solid body. The first solid body may be printed on the first base member based on resin material. Likewise, the second solid body may be printed on the second base member based on resin material. The first base member may have an electrical conductivity on a part of the surface opposed to the second base member. The second base member may likewise have an electrical conductivity on a part of the surface opposed to the first base member. The panel unit may be incorporated within a display apparatus, an information apparatus, or the like. The panel unit may function as an input apparatus.

According to a second aspect of the present invention, there is provided a panel unit comprising: a lower base member; a first electrically conductive body extending on the front surface of the lower base member along the periphery of the lower base member; a first solid body located on the front surface of the lower base member in parallel with the first electrically conductive body; an upper base member opposing the back surface to the front surface of the lower base member; a second electrically conductive body located on the back surface of the upper base member at a position opposed to the first electrically conductive body; and a second solid body located on the back surface of the upper base member at a position opposed to the first solid body.

Even when a larger urging force is applied to the upper base member, the panel unit allows the first and second solid bodies to receive the urging force. The first and second solid bodies serve to hold the urging force. A predetermined space can thus reliably be kept between the first and second electrically conductive bodies. Accordingly, establishment of electric connection can be prevented between the first and second electrically conductive bodies. The panel unit keeps normally operating.

In addition, the first solid body is located on the front surface of the lower base member while the second solid body is located on the back surface of the upper base member. As compared with the case where a single insulating film is employed between the upper and lower base members, the thickness of the individual first and second solid bodies can be reduced. It is possible to reduce the working time for forming the first and second solid bodies. The productivity of the panel unit can thus be improved in a facilitated manner.

The second solid body may be superposed on the first solid body in the panel unit. The first and second bodies reliably cooperate to receive the urging force between the first and second base members. In this case, the second solid body may define a flat surface thereon for receiving a flat surface of the first solid body. The first solid body may be printed on the first base member based on resin material. Likewise, the second solid body may be printed on the second base member based on resin material.

According to a third aspect of the present invention, there is provided a panel unit comprising: a first base member; an electrically conductive film extending on the front surface of the first base member between a pair of electrode; an electrically conductive line extending on the front surface of the first base member at a position spaced from the electrically conductive film and connected to at least one of the electrodes; a first solid body located on the front surface of the first base member in parallel with the electrically conductive line; a second base member opposing the back surface to the front surface of the first base member; an electrically conductive body located on the back surface of the second base member at a position opposed to the electrically conductive line; and a second solid body located on the back surface of the second base member at a position opposed to the first solid body.

Even when a larger urging force is applied to the first base member, the panel unit allows the first and second solid bodies to receive the urging force. The first and second solid bodies serve to hold the urging force. A predetermined space can reliably be kept between the electrically conductive line and the electrically conductive body. Accordingly, establishment of electric connection can be prevented between the electrically conductive line and the electrically conductive body. The panel unit keeps normally operating.

In addition, the first solid body is located on the front surface of the first base member while the second solid body is located on the back surface of the second base member. As compared with the case where a single insulating film is employed between the first and second base members, the thickness of the individual first and second solid bodies can be reduced. It is possible to reduce the working time for forming the first and second solid bodies. The productivity of the panel unit can thus be improved in a facilitated manner. The electrically conductive body may be an electrode connected to an electrically conductive film extending on the back surface of the second base member at a position opposed to the electrically conductive film on the first base member.

According to a fourth aspect of the present invention, there is provided a display apparatus comprising: a display panel unit; a lower base member located along the surface of the display panel unit; a first electrically conductive body extending on the front surface of the lower base member along the periphery of the lower base member; a first solid body located on the front surface of the lower base member in parallel with the first electrically conductive body; an upper base member opposing the back surface to the front surface of the lower base member; a second electrically conductive body located on the back surface of the upper base member at a position opposed to the first electrically conductive body; a second solid body located on the back surface of the upper base member at a position opposed to the first solid body; and a frame member received on the front surface of the upper base member and defining a window opening along the front surface of the upper base member. Here, the first and second solid bodies have a rigidity enough to hold an urging force acting on the upper base member from the frame member.

A user often grasps the periphery of the display apparatus. A larger urging force is applied to the upper base member from the frame member. The first and second solid bodies serve to hold the urging force. Accordingly, a predetermined space can always be kept between the first and second electrically conductive bodies. Specifically, establishment of electric connection can reliably be prevented between the first and second electrically conductive bodies. The panel unit keeps normally operating.

In addition, the first solid body is located on the front surface of the lower base member while the second solid body is located on the back surface of the upper base member. As compared with the case where a single insulating film is employed between the lower and upper base members, the thickness of the individual first and second solid bodies can be reduced. It is possible to reduce the working time for forming the first and second solid bodies. The productivity of the panel unit can thus be improved in a facilitated manner.

According to a fifth aspect of the present invention, there is provided a display apparatus comprising: a display panel unit; a lower base member located along the surface of the display panel unit; a first electrically conductive body extending on the front surface of the lower base member along the periphery of the lower base member; an upper base member opposing the back surface to the front surface of the lower base member; a second electrically conductive body located on the back surface of the upper base member at a position opposed to the first electrically conductive body; an insulator member disposed between the first and second electrically conductive bodies; and a frame member received on the front surface of the upper base member and defining a window opening along the front surface of the upper base member. Here, the insulator member has a rigidity enough to hold an urging force acting on the upper base member from the frame member.

A user often grasps the periphery of the display apparatus. A larger urging force is applied to the upper base member from the frame member. The first and second solid bodies serve to hold the urging force. Accordingly, a predetermined space can always be kept between the first and second electrically conductive bodies. Specifically, establishment of electric connection can reliably be prevented between the first and second electrically conductive bodies. The panel unit keeps normally operating.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
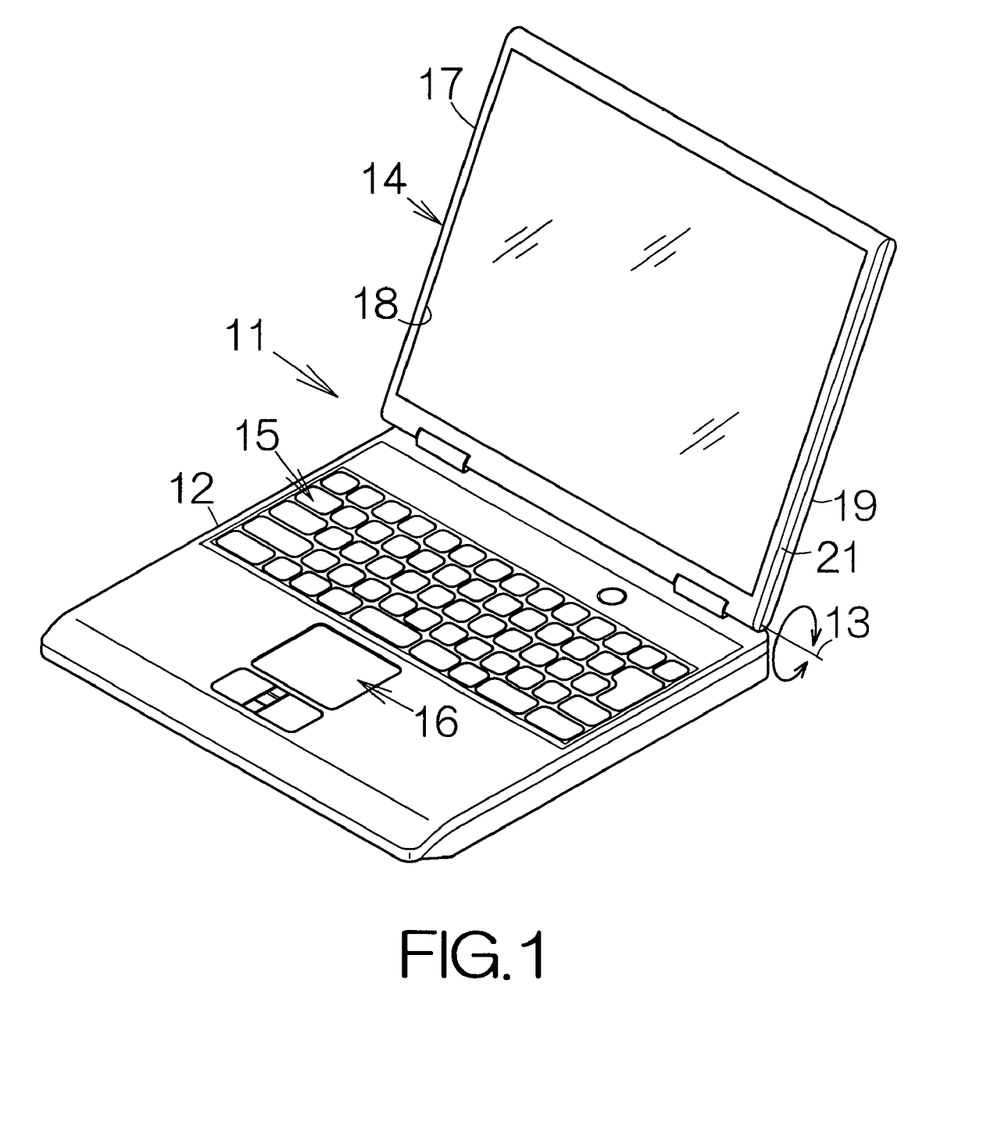
FIG. 1 is a perspective view schematically illustrating the entire structure of a notebook personal computer as a specific example of an electronic apparatus.

FIG. 1 schematically illustrates a notebook personal computer 11 as a specific example of an electronic apparatus. The notebook personal computer 11 includes a thin equipment body 12 and a display apparatus 14 coupled to the equipment body 12 for a relative swinging movement around a predetermined rotation axis 13.

A motherboard, not shown, is contained within the enclosure of the equipment body 12. As conventionally known, a processing circuits such as a central processing unit (CPU) and a memory, for example, are mounted on the motherboard. The CPU serves to operate based on an operating system (OS) and application softwares temporality stored in the memory.

The user is allowed to input various data and instructions to the CPU through input devices such as a keyboard 15, a pointing device 16, and the like.

The display apparatus 14 includes a display enclosure 17. A rectangular window opening 18 is defined in the display enclosure 17. The window opening 18 serves to expose the screen of a liquid crystal display (LCD) panel. Graphics and texts can be displayed on the screen of the LCD panel based on the operation of the CPU.

Figure 2:
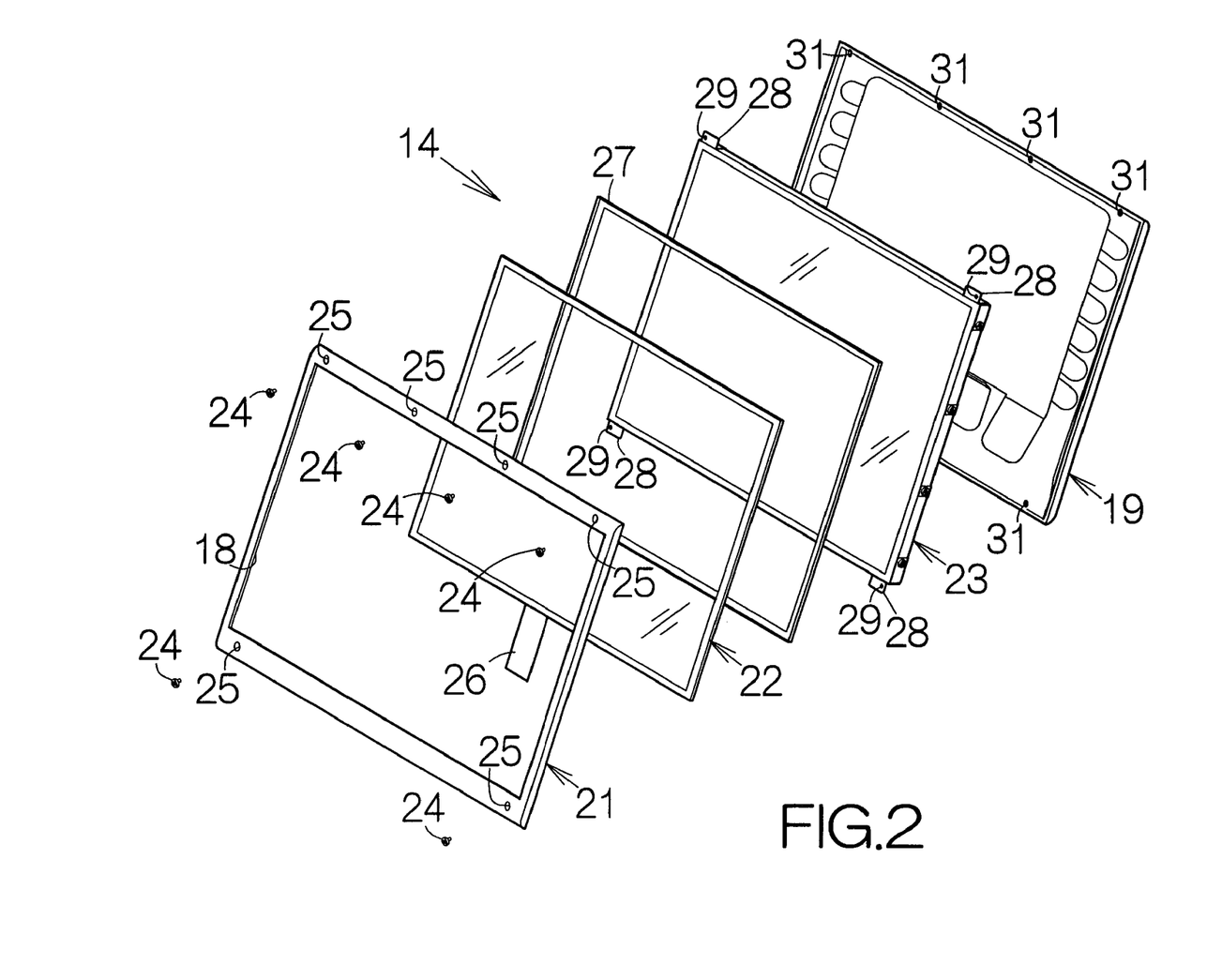
FIG. 2 is an exploded view schematically illustrating the assembly of a touch screen panel unit and a liquid crystal display (LCD) panel unit attached to a cover and a base.

As shown in FIG. 2, the display enclosure 17 includes a base 19 and a cover 21 coupled to the base 19. The cover 21 serves as a frame member. The cover 21 and the base 19 may be made from resin material such as polycarbonate, metal material such as magnesium, or the like. Molding process may be employed to form the cover 21 and the base 19. A touch screen panel unit 22 is contained within a space defined between the cover 21 and the base 19. The space between the cover 21 and the base 19 also contains a LCD panel unit 23 superposed on the back surface of the touch screen panel unit 22. The touch screen panel unit 22 have at least permeability of light or transparency.

Screws 24 are screwed into the display enclosure 17 so as to couple the cover 21 with the base 19. The axes of the screws 24 are aligned in the direction perpendicular to the screen of the display apparatus 14. The screws 24 are inserted from the front surface of the cover 21. Penetrating holes 25 are defined in the cover 21 so as to receive the insertion of the respective screws 24. The penetrating holes 25 may be covered with a dressed material, not shown, for example.

The touch screen panel unit 22 includes a flexible printed circuit (FPC) board 26 extending toward the equipment body 12. The flexible printed circuit board 26 is connected to the motherboard within the equipment body 12. A controller circuit such as a controller chip, not shown, is mounted on the motherboard. The controller circuit serves to control the operation of the touch screen panel unit 22.

Panel-shaped module components such as a LCD panel, a diffuser, a prism plate, a light guide plate, a reflector are in this sequence superposed on one another in the LCD panel unit 23. Two fluorescent tubes are disposed adjacent the lower end of the light guide plate, for example. A circuit board is disposed behind the reflector for controlling the display. The circuit board is interposed between front and back insulating sheets. A flexible printed circuit board is connected to the circuit board. The flexible printed circuit board is connected to the motherboard within the equipment body 12.

A spacer 27 is interposed between the touch screen panel unit 22 and the LCD panel unit 23. The spacer 27 includes a surrounding that surrounds the outer periphery of the touch screen panel unit 22. The back surface of the spacer 27 is received on the front surface of the LCD panel unit 23. The spacer 27 may be made of any elastic material such as rubber. The spacer 27 serves to keep a predetermined space between the touch screen panel unit 22 and the LCD panel unit 23.

Protruding tongues 28 are defined in the LCD panel unit 23. The protruding tongues 28 are designed to extend outward from the outer periphery of the LCD panel unit 23. Penetrating holes 29 are defined in the protruding tongues 28 to receive the insertion of the screws 24. On the other hand, screwed bores 31 are formed in the base 19 so as to receive the insertion of the screws 24. The screws 24 are received in the screwed bores 31 after the screws 24 have penetrating through the cover 21 and the protruding tongue 28. The touch screen panel unit 22 and the LCD panel unit 23 are in this manner fixed between the cover 21 and the base 19.

Figure 3:
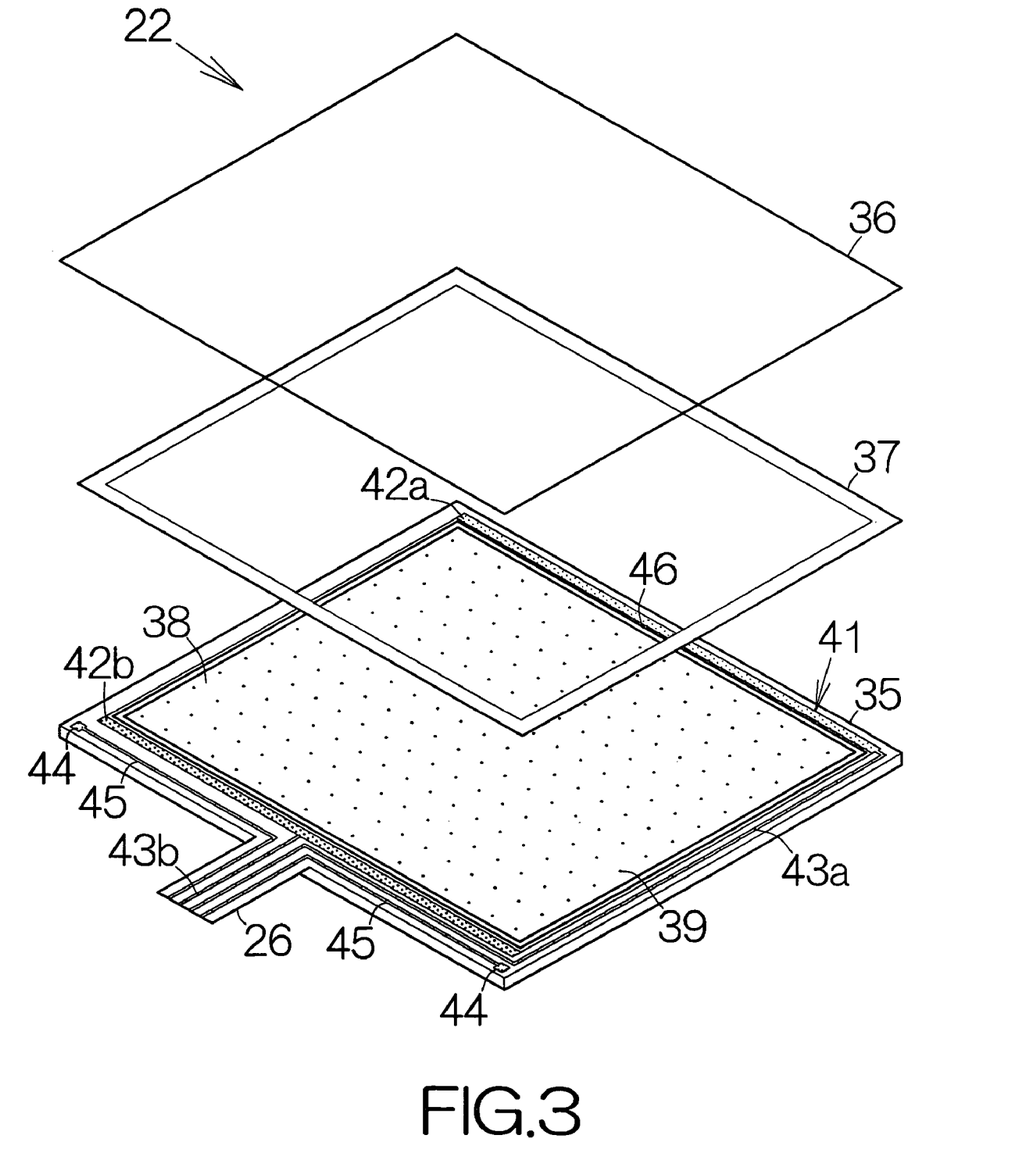
FIG. 3 is an exploded view schematically illustrating the structure of a touch screen panel unit.

As shown in FIG. 3, the touch screen panel unit 22 includes a rectangular first base member or lower base member 35, and a rectangular second base member or upper base member 36 opposing the back surface to the front surface of the lower base member 35. The lower base member 35 may be made of a transparent glass substrate, for example. The lower base member 35 thus has permeability of light. The upper base member 36 may be made of a transparent resin film such as polyethylene terephthalate (PET) film, for example. The upper base member 36 thus has permeability of light. The upper base member 36 has a contour identical to that of the lower base substrate 35. An adhesive material 37 is interposed between the lower and upper base members 35, 36. The adhesive material 37 as an insulating member forms a frame extending along the outer periphery of the lower and upper base members 35, 36. The adhesive material 37 serves to fixedly couple the periphery of the upper base member 36 with the periphery of the lower base member 35.

Figure 4:
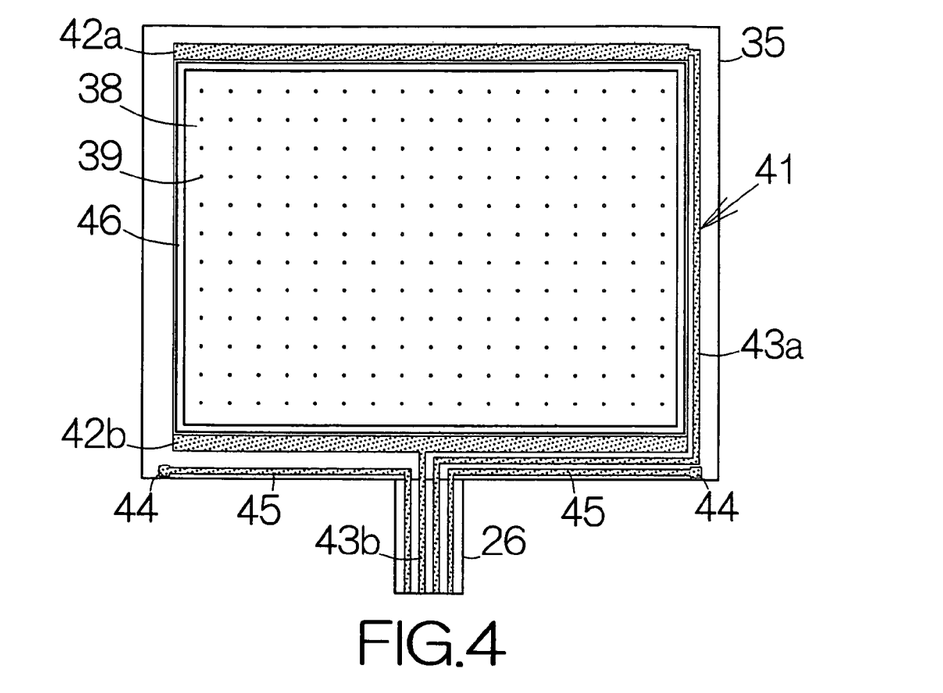
FIG. 4 is a plan view of a lower base member according to a specific example.

Referring also to FIG. 4, a transparent first electrically conductive film 38 extends over the front surface of the lower base member 35. The first electrically conductive film 38 has a rectangular shape. The front surface of the lower base member 35 is exposed around the first electrically conductive film 38. The first electrically conductive film 38 may be made of an indium-tin oxide (ITO) film, for example. Dot spacers 39 are located on the upper surface of the first electrically conductive film 38 at positions equally spaced. The dot spacers 39 are arranged according to a lattice. The dot spacer 39 is a hemisphere swelling from the upper surface of the first electrically conductive film 38. The dot spacers 39 may be made of a resin material having an insulating property, for example.

A first electrically conductive body 41 extends on the front surface of the lower base member 35 along the outer periphery of the lower base member 35. The first electrically conductive body 41 includes a pair of first electrode 42a, 42b and a pair of first electrically conductive line 43a, 43b. The first electrodes 42a, 42b are individually connected to the first electrically conductive film 38. The first electrically conductive lines 43a, 43b are separately connected to the first electrodes 42a, 42b, respectively. The first electrodes 42a, 42b extend along the longer sides of the rectangular first electrically conductive film 38. The first electrically conductive film 38 thus extends between the first electrodes 42a, 42b. The first electrically conductive line 43a extends toward the flexible printed circuit board 26 at a location spaced from the first electrically conductive film 38. The first electrically conductive line 43a first extends along the shorter side of the rectangular first electrically conductive film 38. The first electrically conductive line 43a then extends in parallel with the first electrode 42b. The first electrically conductive line 43b likewise extends toward the flexible printed circuit board 26 at a location spaced from the first electrically conductive film 38. The first electrodes 42a, 42b and the first electrically conductive lines 43a, 43b may be made of a metal material such as silver, copper, or the like.

A pair of first electrically conductive pads 44, 44 are formed on the front surface of the lower base member 35 at locations spaced from the first electrically conductive film 38, the first electrodes 42a, 42b and the first electrically conductive lines 43a, 43b. An electrically conductive line 45 is connected to the first electrically conductive pad 44. The electrically conductive line 45 extends on the front surface of the lower base member 35 at a location spaced from the first electrodes 42a, 42b and the first electrically conductive lines 43a, 43b. The electrically conductive line 45 is directed to the flexible printed circuit board 26. The first electrically conductive pads 44 and the electrically conductive lines 45 may be made of a metal material such as silver, copper, or the like.

A first insulating solid body or stripe 46 is fixed on the surface of the first electrically conductive film 38. The first solid stripe 46 forms a frame extending along the outer periphery of the first electrically conductive film 38. The first solid stripe 46 extends in parallel with the first electrodes 42a, 42b and the first electrically conductive line 43a. Here, the first solid stripe 46 is located between the first electrodes 42a, 42b and the first electrically conductive line 43a. The first solid stripe 46 may be made of a silicone-based material, for example.

Figure 5:
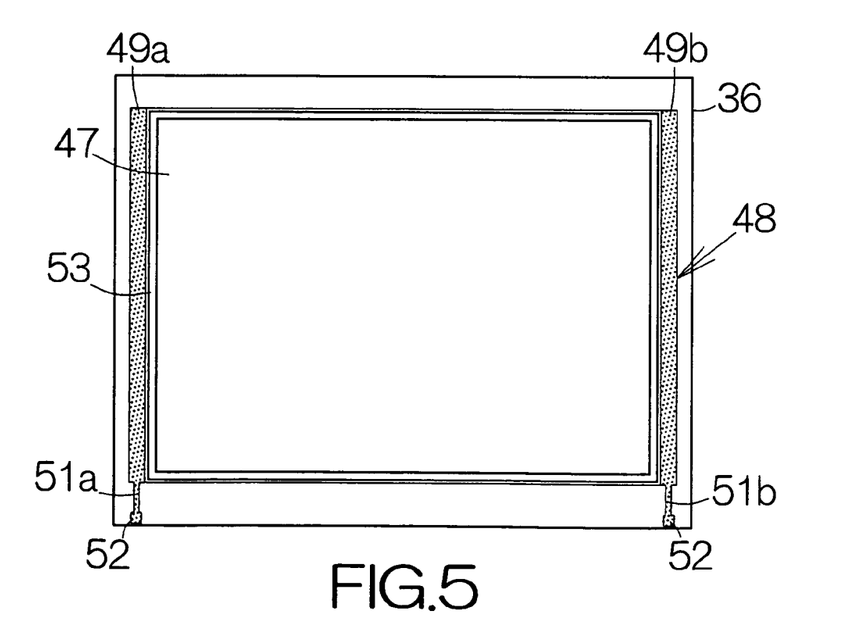
FIG. 5 a plan view of an upper base member according to a specific example.

Referring also to FIG. 5, a transparent second electrically conductive film 47 extends over the back surface of the upper base member 36. The second electrically conductive film 47 has a rectangular shape. The back surface of the upper base member 36 is exposed around the second electrically conductive film 47. The second electrically conductive film 47 is located at a position opposed to the first electrically conductive film 38. The second electrically conductive film 47 may be made of an indium-tin oxide (ITO) film, for example, in the same manner as the first electrically conductive film 38.

A second electrically conductive body 48 extends on the back surface of the upper base member 36 along the outer periphery of the upper base member 36. The second electrically conductive body 48 includes a pair of second electrode 49a, 49b and a pair of second electrically conductive line 51a, 51b. The second electrodes 49a, 49b are individually connected to the second electrically conductive film 47. The second electrically conductive lines 51a, 51b are separately connected to the second electrodes 49a, 49b, respectively. The second electrodes 49a, 49b extend along the shorter sides of the rectangular second electrically conductive film 47. The second electrically conductive film 47 thus extends between the second electrodes 49a, 49b. Here, the second electrode 49a is located at a position opposed to the first electrically conductive line 43a.

The ends of the second electrically conductive lines 51a, 51b are connected to the second electrically conductive pads 52, 52. The second electrically conductive pads 52 are located on the back surface of the upper base member 36 at positions spaced from the second electrically conductive film 47 and the second electrodes 49a, 49b. The second electrodes 49a, 49b, the second electrically conductive lines 51a, 51b and the second electrically conductive pads 52 may be made of a metal material such as silver, copper, or the like. When the lower base member 35 is coupled with the upper base member 36 with the aforementioned adhesive material 37, the individual second electrically conductive pads 52, 52 are connected to the corresponding first electrically conductive pads 44, 44, respectively. The second electrically conductive pads 52, 52 are thus connected to the electrically conductive lines 45, 45 on the lower base member 35.

A second solid body or stripe 53 is fixed on the surface of the second electrically conductive film 47. The second solid stripe 53 forms a frame extending along the outer periphery of the second electrically conductive film 47. The second solid stripe 53 is located at a position opposed to the first solid stripe 46. The second solid stripe 53 extends in parallel with the second electrodes 49a, 49b. Here, the second solid stripe 53 is located inside the second electrodes 49a, 49b. The second solid stripe 53 may be made of a silicone-based material, for example, in the same manner as the first solid stripe 46.

As shown in FIG. 6, when the touch screen panel unit 22 is incorporated within the display enclosure 17, the lower base member 35 is located along the front surface of the LCD panel unit 23. The front surface of the upper base member 36 receives the cover 21. The window opening 18 of the cover 21 is thus arranged on the front surface of the upper base member 36. The first and second solid stripes 46, 53, the electrically conductive line 43a and the second electrode 49a are located off the window opening 18.

The adhesive material 37 is interposed between the first electrically conductive line 43a and the second electrode 49a. The adhesive material 37 may be an insulating double-sided adhesive sheet serving as an insulator layer. The adhesive material 37 serves to insulate the electrically conductive line 43a from the second electrode 49a. The adhesive material 37 includes a substrate 37a and adhesive layers 37b formed on the front and back surfaces of the substrate 37a. The substrate 37a may be made of a resin material such as silicone. The adhesive layers 37b may be made of an acrylic resin material. The substrate 37a serves to hold an urging force acting on the upper base member 36 from the cover 21.

The second solid stripe 53 is superposed on the first solid stripe 46 between the lower and upper base members 35, 36. A flat surface 53a of the second solid stripe 53 is received on a flat surface 46a of the first solid stripe 46. The first and second solid stripes 46, 53 are designed to have a total thickness larger than that of the first electrically conductive line 43a and the second electrode 49a. The first and second solid stripes 46, 53 respectively have a rigidity higher than that of the adhesive material 37. Here, the first and second solid stripes 46, 53 have a rigidity enough to hold an urging force acting on the upper base member 36 from the cover 21.

For example, assume that an application software is to be booted up based on the input manipulation of the touch screen panel unit 22. An icon representing the application software is displayed on the screen of the LCD panel inside the window opening 18. The position of the icon is determined based on the x- and y-coordinate.

Now, if the user touches the upper base member 36 of the touch screen panel unit 22 at the icon, the upper base member 36 deforms at the corresponding touch position. The deformation of the upper base member 36 causes the second electrically conductive film 47 on the upper base member 36 to contact the first electrically conductive film 38 on the lower base member 35. An electric potential gradient is induced in the second electrically conductive film 47 on the upper base member 36, so that the x-coordinate of the touch position can be determined. Voltage is applied to the second electrically conductive film 47 through the electrically conductive lines 45, the second electrically conductive lines 51a, 51b and the second electrodes 49a, 49b. The electric potential of the touch position is taken out from the first electrically conductive film 38. The electric potential of the touch position is utilized to determine the x-coordinate.

An electric potential gradient is likewise induced in the first electrically conductive film 38 on the lower base member 35, so that the y-coordinate of the touch position can be determined. Voltage is applied to the first electrically conductive film 38 through the first electrically conductive lines 43a, 43b and the first electrodes 42a, 42b. The electric potential of the touch position is taken out from the second electrically conductive film 47. The electric potential of the touch position is utilized to determine the y-coordinate. The x- and y-coordinates are supplied to the CPU. The CPU observes the relationship between the x- and y-coordinates and the aforementioned x- and y-coordinates. If the correspondence is confirmed, the CPU operates to boot the application software.

A user of the notebook personal computer 11 often grasps the periphery of the display apparatus 14. A larger urging force is applied to the upper base member 36 from the cover 21. The first and second solid stripes 46, 53 serve to hold the urging force. Accordingly, a predetermined space can always be kept between the first electrically conductive line 43a and the second electrode 49a. Specifically, establishment of electric connection can reliably be prevented between the first electrically conductive line 43a and the second electrode 49a. The touch screen panel unit 22 keeps normally operating.

In addition, the screws 24 are inserted from the front surface of the cover 21 when the display apparatus 14 is assembled. A larger urging force is applied to the upper base member 36 from the cover 21 through the insertion of the screws 24. Even in such a case, the first and second solid stripes 46, 53 serve to reliably prevent establishment of electric connection between the first electrically conductive line 43a and the second electrode 49a.

Next, a brief explanation will be made on a method of making the touch screen panel unit 22. The lower and upper base members 35, 36 are first separately prepared. The first and second electrically conductive films 38, 47 have been evaporated on the lower and upper base members 35, 36, respectively. The first electrically conductive body 41 is then formed on the lower base member 35 along the periphery. The second electrically conductive body 48 is formed on the upper base member 36 along the periphery. In this case, silver or copper paste is first printed on a predetermined substrate in patterns corresponding to the electrodes and the electrically conductive lines. The silver or copper paste gets hardened based on an applied heat. The patterned electrodes and electrically conductive lines are then transferred from the substrate to the lower and upper base members 35, 36 at predetermined positions. The dot spacers 39 are formed on the upper surface of the first electrically conductive film 38. A resin material may be applied to predetermined positions to establish the individual dot spacers 39, for example.

The first and second solid stripes 46, 53 are printed on a predetermined substrate based on resin material such as silicone, for example. The resin material gets hardened based on an applied heat or ultraviolet. The formed first and second solid stripes 46, 53 are then transferred to the lower and upper base members 35, 36, respectively, at predetermined positions. The adhesive material 37 is thereafter interposed between the lower and upper base members 35, 36. The upper base member 36 is in this way coupled to the lower base member 35. It should be noted that resin material such as silicone may be applied on the lower and upper base members 35, 36 in parallel to the first and second electrically conductive bodies 41, 49, respectively, so as to form the first and second solid stripes 46, 53. In this case, the resin material is allowed to get hardened on the lower and upper base members 35, 36 based on an applied heat or ultraviolet.

The aforementioned method allows the resin material to get hardened or cured based on an applied heat or ultraviolet so as to form the first and second solid stripes 46, 53. The touch screen panel unit 22 enables establishment of the first solid stripe 46 on the front surface of the lower base member 35 as well as establishment of the second solid stripe 53 on the back surface of the upper base member 36. As compared with the case where a single insulating film is employed between the lower and upper base members 35, 36, the thickness of the individual first and second solid stripes 46, 53 can be reduced. It is possible to reduce the working time for hardening or curing the first and second solid stripes 46, 53. The productivity of the touch screen panel unit 22 can be improved in a facilitated manner.

Figure 7:
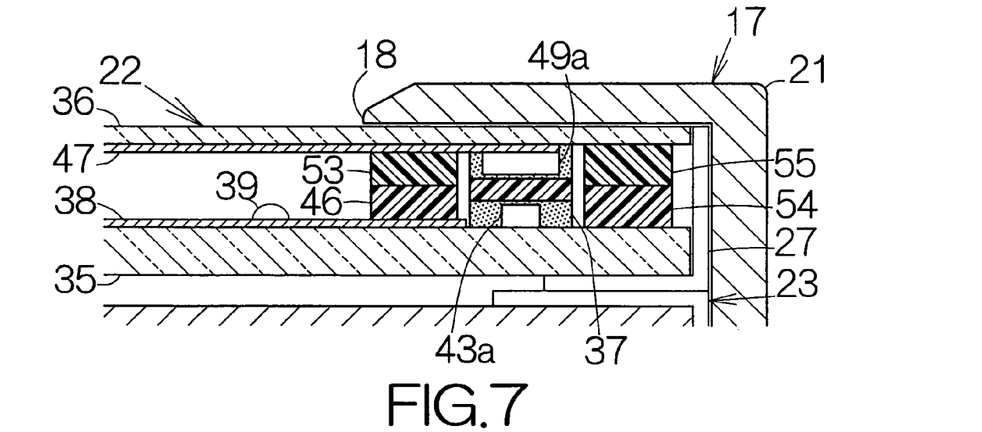
FIG. 7 is an enlarged partial sectional view schematically illustrating the structure of the touch screen panel unit according to a modified example.

As shown in FIG. 7, third and fourth solid stripes 54, 55 may be located outside the first electrically conductive line 43a and the second electrode 49a, in addition to the aforementioned first and second solid stripes 46, 53, for example. The third and fourth solid stripes 54, 55 may have the structure identical to that of the first or second solid stripe 46, 53. Since the adhesive material 37 is disposed in a space between the first and second solid stripes 46, 53 and the third and fourth solid stripes 54, 55, the adhesive material 37 can reliably be protected from an urging force acting on the upper base member 36 from the cover 21. A space can reliably be kept between the first electrically conductive line 43a and the second electrode 49a.

Figure 8:
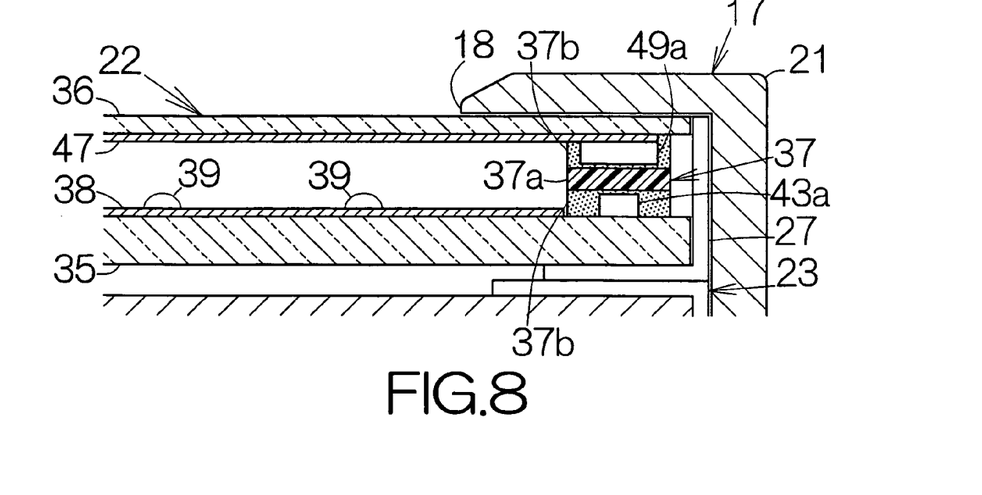
FIG. 8 is an enlarged partial sectional view schematically illustrating the structure of the touch screen panel unit according to another modified example.

As shown in FIG. 8, the adhesive material 37 may include a substrate 37a made of hard resin material such as silicone, for example. The adhesive material 37 of the type itself serves to receive an urging force acting on the upper base member 36 from the cover 21. The adhesive material 37 itself serves to hold the urging force. A space can reliably be kept between the first electrically conductive line 43a and the second electrode 49a. Here, the first and second solid stripes 46, 53 may be omitted in this case.

Figure 9:
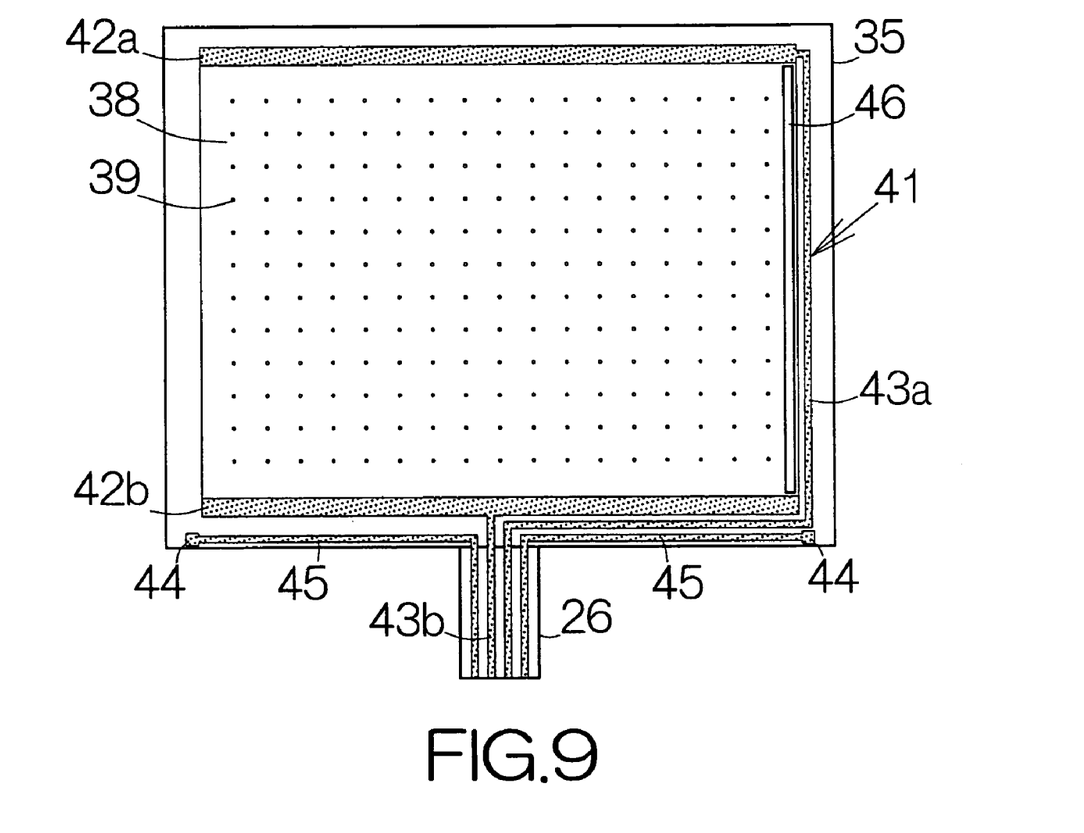
FIG. 9 is a plan view of the lower base member for schematically illustrating the structure of the lower base member according to a further modified example.

As shown in FIG. 9, the first solid stripe 46 on the lower base member 35 may be located only near the first electrically conductive line 43a, for example. Likewise, the second solid stripe 53 on the upper base member 36 may be located only near the second electrode 49a. These first and second solid stripes 46, 53 still serve to reliably protect the adhesive material 37 from an urging force acting on the upper base member 36 from the cover 21. A space can reliably be kept between the first electrically conductive line 43a and the second electrode 49a.

The touch screen panel unit 22 may be employed not only in the notebook personal computer 11 but also in any type of information or electronic apparatus such as a tablet personal computer, a cellar phone terminal, a personal digital assistance (PDA), a point-of-sales (POS) terminal, a global positioning system (GPS) terminal, a facsimile machine, a copying machine, a car navigation system, and the like.

What is claimed is:

1. A touch screen panel unit comprising:
    a first base member;
    a first electrically conductive body located on a side of the first base member;
    a first solid body located on the side of the first base member;
    a second base member opposed to the first base member, said first electrically conductive body located between the first and second base members;
    a second electrically conductive body located on the second base member at a position opposed to the first electrically conductive body; and
    a second solid body located on the second base member at a position opposed to the first solid body so as to electrically separate the first and second electrically conductive bodies upon an application of an urging force on one of the first and second base members of the touch screen panel unit, wherein:
    the first electrically conductive body includes a first conductive film and a pair of first electrodes located on the side of the first base member, the first electrodes connected to opposite sides of the first electrically conductive film, respectively;
    the second electrically conductive body includes a second electrically conductive film located on the second base member at a position opposed to the first electrically conductive film and a pair of second electrodes located on the side of the second base member, the second electrodes connected to opposite sides of the second electrically conductive film, respectively; and
    the touch screen panel unit further comprising an electrically conductive line located on the side of the first base member at a position opposed to at least one of the second electrodes, the electrically conductive line connected to one of the first electrodes.

2. The touch screen panel unit according to claim 1, wherein said second solid body is superposed on the first solid body.

3. The touch screen panel unit according to claim 1, wherein a flat surface is defined on the second solid body for receiving a flat surface of the first solid body.

4. The touch screen panel unit according to claim 1, wherein said first solid body is printed on the first base member based on resin material, said second solid body being printed on the second base member based on resin material.

5. A display apparatus comprising:
a first base member;
a first electrically conductive film located on a side of the first base member;
a pair of first electrodes located on the side of the first base member, the first electrodes connected to opposite sides of the first electrically conductive film, respectively;
a first solid body located on the side of the first base member;
a second base member opposed to the first base member, said first electrically conductive film located between the first and second base members;
a second electrically conductive film located on the second base member at a position opposed to the first electrically conductive film;
a pair of second electrodes located on the side of the second base member, the second electrodes connected to opposite sides of the second electrically conductive film, respectively;
a second solid body located on the second base member at a position opposed to the first solid body; and
a first electrically conductive line located on the side of the first base member at a position opposed to at least one of the second electrodes, the electrically conductive line connected to one of the first electrodes.

6. The display apparatus according to claim 5, wherein said second solid body is superposed on the first solid body.

7. The display apparatus according to claim 5, wherein a flat surface is defined on the second solid body for receiving a flat surface of the first solid body.

8. The display apparatus according to claim 5, wherein said first solid body is printed on the first base member based on resin material, said second solid body being printed on the second base member based on resin material.

9. An information apparatus comprising:
a first base member;
a first electrically conductive film located on a side of the first base member;
a pair of first electrodes located on the side of the first base member, the first electrodes connected to opposite sides of the first electrically conductive film, respectively;
a first solid body located on the side of the first base member;
a second base member opposed to the first base member, said first electrically conductive film located between the first and second base members;
a second electrically conductive film located on the second base member at a position opposed to the first electrically conductive film;
a pair of second electrodes located on the side of the second base member, the second electrodes connected to opposite sides of the second electrically conductive film, respectively;
a second solid body located on the second base member at a position opposed to the first solid body; and
a first electrically conductive line located on the side of the first base member at a position opposed to at least one of the second electrodes, the electrically conductive line connected to one of the first electrodes.

10. The information apparatus according to claim 9, wherein said second solid body is superposed on the first solid body.

11. The information apparatus according to claim 9, wherein a flat surface is defined on the second solid body for receiving a flat surface of the first solid body.

12. The information apparatus according to claim 9, wherein said first solid body is printed on the first base member based on resin material, said second solid body being printed on the second base member based on resin material.

13. A touch-screen input apparatus comprising:
a first base member;
a first electrically conductive body located on a side of the first base member;
a first solid body located on the side of the first base member;
a second base member opposed to the first base member, said first electrically conductive body located between the first and second base members;
a second electrically conductive body located on the second base member at a position opposed to the first electrically conductive body; and
a second solid body located on the second base member at a position opposed to the first solid so as to electrically separate the first and second electrically conductive bodies upon an application of an urging force on one of the first and second base members of the touch-screen input apparatus, wherein:
the first electrically conductive body includes a first conductive film and a pair of first electrodes located on the side of the first base member, the first electrodes connected to opposite sides of the first electrically conductive film, respectively;
the second electrically conductive body includes a second electrically conductive film located on the second base member at a position opposed to the first electrically conductive film and a pair of second electrodes located on the side of the second base member, the second electrodes connected to opposite sides of the second electrically conductive film, respectively; and
the touch-screen input apparatus further comprising an electrically conductive line located on the side of the first base member at a position opposed to at least one of the second electrodes, the electrically conductive line connected to one of the first electrodes.

14. The touch-screen input apparatus according to claim 13, wherein said second solid body is superposed on the first solid body.

15. The touch-screen input apparatus according to claim 13, wherein a flat surface is defined on the second solid body for receiving a flat surface of the first solid body.

16. The touch-screen input apparatus according to claim 13, wherein said first solid body is printed on the first base member based on resin material, said second solid body being printed on the second base member based on resin material.

17. The display apparatus of claim 5 further comprising:
- a second electrically conductive line located on the side of the second base member; and
- a third solid body located between the first and second electrically conductive lines so as to electrically separate the first and second electrically conductive lines.

18. The information apparatus of claim 9 further comprising:
- a second electrically conductive line located on the side of the second base member; and
- a third solid body located between the first and second electrically conductive lines so as to electrically separate the first and second electrically conductive lines.

* * * * *